(12) United States Patent
Muehlenbrock et al.

(10) Patent No.: US 11,945,398 B2
(45) Date of Patent: Apr. 2, 2024

(54) VEHICLE SEAT STRUCTURE AND METHOD FOR ASSEMBLING A VEHICLE SEAT STRUCTURE

(71) Applicant: ADIENT ENGINEERING AND IP GMBH, Burscheid (DE)

(72) Inventors: Ludger Muehlenbrock, Recklinghausen (DE); Toralf Mueller, Leverkusen (DE); Tobias Schaffert, Solingen (DE); Klaus Tupuschies, Muehlheim an der Ruhr (DE)

(73) Assignee: Adient US LLC, Plymouth, MI (US)

( * ) Notice: Subject to any disclaimer, the term of this patent is extended or adjusted under 35 U.S.C. 154(b) by 371 days.

(21) Appl. No.: 17/281,284

(22) PCT Filed: Oct. 15, 2019

(86) PCT No.: PCT/EP2019/077889
§ 371 (c)(1),
(2) Date: Mar. 30, 2021

(87) PCT Pub. No.: WO2020/083706
PCT Pub. Date: Apr. 30, 2020

(65) Prior Publication Data
US 2021/0394706 A1 Dec. 23, 2021

(30) Foreign Application Priority Data
Oct. 22, 2018 (DE) .................... 10 2018 126 207.8

(51) Int. Cl.
*B60R 22/26* (2006.01)
*B60N 2/22* (2006.01)
*B60N 2/68* (2006.01)

(52) U.S. Cl.
CPC ............ *B60R 22/26* (2013.01); *B60N 2/2222* (2013.01); *B60N 2/682* (2013.01); *B60N 2002/684* (2013.01)

(58) Field of Classification Search
CPC ...... B60R 22/26; B60N 2/2222; B60N 2/682; B60N 2002/684
(Continued)

(56) References Cited

U.S. PATENT DOCUMENTS

| | | | |
|---|---|---|---|
| 3,091,496 A | 5/1963 | Bentley | |
| 5,088,794 A * | 2/1992 | Iwami | ..................... B60R 22/34 297/483 |

(Continued)

FOREIGN PATENT DOCUMENTS

| | | |
|---|---|---|
| CN | 1519146 A | 8/2004 |
| CN | 204383104 U | 6/2015 |

(Continued)

OTHER PUBLICATIONS

PCT International Search Report and Written Opinion (PCT/EP2019/077889).

(Continued)

*Primary Examiner* — Toan C To
(74) *Attorney, Agent, or Firm* — Marshall & Melhorn, LLC

(57) ABSTRACT

A vehicle seat structure for a vehicle seat may have a structural component having an inertia belt reel. The inertia belt reel may be arranged in a cavity of the structural component, and the structural component may be connected to at least one further component of the vehicle seat structure. A method for assembling such a vehicle seat structure may include providing a structural component having an inertia belt reel and at least one further component of the vehicle seat structure that are displaced and/or rotated rela- (Continued)

tive to one another such that the structural component and the at least one further component of the vehicle seat structure take up an end position with respect to one another. In a further step, the structural component and the at least one further component of the vehicle seat structure are connected to one another in a form-fitting and/or integrally bonded and/or force-fitting manner.

5 Claims, 13 Drawing Sheets

(58) Field of Classification Search
USPC .............................. 280/801.1, 806, 807, 808
See application file for complete search history.

(56) References Cited

U.S. PATENT DOCUMENTS

| | | | |
|---|---|---|---|
| 5,441,332 A * | 8/1995 | Verellen | B60R 22/26 297/483 |
| 5,653,504 A * | 8/1997 | Henson | B60N 2/3084 297/238 |
| 5,704,684 A * | 1/1998 | Dukatz | B60R 22/357 297/238 |
| 5,829,831 A * | 11/1998 | Sharman | B60R 22/34 297/483 |
| 5,934,760 A | 8/1999 | Schroth | |
| 6,139,111 A * | 10/2000 | Pywell | B60N 2/809 297/216.13 |
| 6,682,009 B1 * | 1/2004 | Frank | B60R 22/3413 242/379.1 |
| 6,811,186 B1 * | 11/2004 | Fraley | B60R 22/20 297/483 |
| 6,817,672 B2 * | 11/2004 | Matsunuma | B60N 2/688 297/483 |
| 7,159,478 B2 * | 1/2007 | Schubert | B60R 22/00 73/865.9 |
| 8,303,043 B2 * | 11/2012 | Humbert | B60R 22/40 297/477 |
| 8,820,789 B2 * | 9/2014 | Merrill | B60R 22/26 297/480 |
| 10,144,326 B2 * | 12/2018 | Hayashi | B60N 2/688 |
| 10,273,008 B2 * | 4/2019 | Porter | B64D 11/062 |
| 10,870,410 B2 * | 12/2020 | Jabusch | B60R 22/4628 |
| 10,933,784 B2 * | 3/2021 | Yilma | B60N 2/6009 |
| 11,577,687 B2 * | 2/2023 | Jabusch | B60R 22/4628 |
| 2003/0047971 A1 | 3/2003 | Fohrenkamm et al. | |
| 2003/0160498 A1 * | 8/2003 | Boelstler | B60R 22/26 297/483 |
| 2004/0036345 A1 * | 2/2004 | Herberg | B60R 22/44 297/480 |
| 2004/0251675 A1 * | 12/2004 | Herberg | B60R 22/4604 280/806 |
| 2004/0262905 A1 * | 12/2004 | Herberg | B60R 22/02 280/808 |
| 2005/0121897 A1 | 6/2005 | Elizondo et al. | |
| 2008/0116679 A1 | 5/2008 | Burckhard et al. | |
| 2008/0296884 A1 * | 12/2008 | Rouhana | B60R 22/26 280/808 |
| 2017/0088094 A1 | 3/2017 | Hillman | |
| 2020/0047710 A1 * | 2/2020 | Jabusch | B60R 22/4628 |

FOREIGN PATENT DOCUMENTS

| | | |
|---|---|---|
| CN | 204472747 U | 7/2015 |
| CN | 105793107 A | 7/2016 |
| DE | 69501759 T2 | 10/1998 |
| DE | 10 2012 022 159 | 3/2014 |
| EP | 2644444 A1 | 10/2013 |
| EP | 3238989 A1 | 11/2017 |
| FR | 3034062 A3 | 9/2016 |
| GB | 2435244 A | 8/2007 |
| JP | 2007112198 A | 5/2007 |
| JP | 2017226336 A | 12/2017 |

OTHER PUBLICATIONS

China National Intellectual Property Administration, Office Action in Application No. 201980069419.3, dated Oct. 9, 2022, 18 pages.
European Search Report for application No. 22196582.5, dated Jan. 17, 2023, 8 pages.
China National Intellectual Property Administration, Office Action in Application No. CN201980069419.3, dated Aug. 3, 2023, 16 pages.

* cited by examiner

VEHICLE SEAT STRUCTURE AND METHOD FOR ASSEMBLING A VEHICLE SEAT STRUCTURE

FIELD

The invention relates to a vehicle seat structure for a vehicle seat, comprising a structural component having an inertia belt reel, and to a method for assembling such a vehicle seat structure.

BACKGROUND

DE 10 2012 022 159 A1 discloses a backrest structure for a vehicle seat, in particular for a foldable backrest of a rear seat system of a motor vehicle, wherein the backrest structure comprises an installation slot into which an inertia belt reel can be inserted. During the assembly of the vehicle seat, the inertia belt reel is inserted from above into the installation slot after production of the backrest structure.

SUMMARY

The invention is based on the problem of improving a vehicle seat of the type mentioned at the beginning, in particular of optimizing the integration of an inertia belt reel in the vehicle seat structure in respect of the construction space required and the force flux. In particular, the intention is also to provide a cost-effective assembly method for such a vehicle seat.

This problem is solved according to the invention by a vehicle seat structure for a vehicle seat, comprising a structural component having an inertia belt reel, wherein the inertia belt reel is arranged in a cavity of the structural component, and the structural component is connected to at least one further component of the vehicle seat structure in a form-fitting and/or integrally bonded and/or force-fitting manner.

A structural component and a further component of the vehicle seat structure should be understood in each case as meaning a load-bearing component of the vehicle seat structure. An essential function of the structural component and of the further component of the vehicle seat structure is therefore to ensure the necessary rigidity and strength of the vehicle seat structure for use of the vehicle seat as intended, but in particular also in the event of a crash. By contrast, for example, cushion parts and covers generally do not have a load-bearing function.

Owing to the fact that the structural component has a cavity, wherein the inertia belt reel is arranged in the cavity, and the structural component is connected to at least one further component of the vehicle seat structure in a form-fitting and/or integrally bonded and/or force-fitting manner, the integration of the inertia belt reel in the vehicle seat structure is optimized in respect of the required construction space and the force flux.

The vehicle seat structure preferably has a backrest structure. The backrest structure can have a first side strut and a second side strut. The structural component having the inertia belt reel can connect the two side struts to each other. At least one of the two side struts can be composed of a first side strut profile and at least one second side strut profile. The side strut profiles preferably form a side strut with a substantially closed profile. A closed profile has great rigidity and can dissipate high belt loads.

The structural component having the inertia belt reel can be screwed to at least one of the two side struts. The structural component having the inertia belt reel can be riveted to at least one of the two side struts. The structural component having the inertia belt reel can be welded to at least one of the two side struts. The structural component having the inertia belt reel can be pushed through an opening in one of the two side struts. The structural component having the inertia belt reel can be pushed parallel to a transverse direction through an opening in one of the two side struts.

The structural component having the inertia belt reel can form one of the two side struts. The structural component having the inertia belt reel can be part of one of the two side struts.

An inertia belt reel for retracting a shoulder belt of a belt system can be arranged in the structural component. The belt system can be a 3 point belt system.

The vehicle seat structure can have a seat substructure. A backrest structure can be fixedly connected to the seat substructure. A backrest structure can be coupled pivotably to the seat substructure by means of at least one fitting. A structural component having an inertia belt reel can form a component of the seat substructure. The structural component having the inertia belt reel can be a seat frame side part of the seat substructure.

An inertia belt reel for retracting a lap belt of a belt system can be arranged in the structural component. The belt system can be a 3 point belt system. The vehicle seat structure can have both a structural component with an inertia belt reel for retracting a shoulder belt and a further structural component with an inertia belt reel for retracting a lap belt of a belt system. The two inertia belt reels can be part of precisely one 3 point belt system.

The problem is also solved by a method for assembling a vehicle seat structure according to the invention, in which in one method step, a structural component having an inertia belt reel and at least one further component of the vehicle seat structure are displaced and/or rotated relative to one another such that the structural component and the at least one further component of the vehicle seat structure take up an end position with respect to one another, and, in a further method step, are connected to one another in a form-fitting and/or integrally bonded and/or force-fitting manner.

Owing to the fact that, in one method step, the structural component and the at least one further component of the vehicle seat structure are displaced and/or rotated relative to one another such that the structural component and the at least one further component of the vehicle seat structure take up their end position with respect to one another and, in a further method step, are connected to one another in a form-fitting and/or integrally bonded and/or force-fitting manner, a cost-effective assembly method for such a vehicle seat is provided.

The structural component having the inertia belt reel is preferably a testable unit. The functioning of the structural component having the inertia belt reel can be tested prior to the connection of the structural component having the inertia belt reel to the at least one further component of the vehicle seat structure. In particular, the functioning of the inertia belt reel can be tested. This has the advantage that defective structural components and defective inertia belt reels can be identified at an early point and therefore the quality costs can be reduced.

The structural component having the inertia belt reel is pivoted into the end position about a pivot axis preferably during the method. The pivot axis can run approximately parallel to a longitudinal direction. The structural component having the inertia belt reel can be pivoted into the end position relative to two side struts of a backrest structure.

Preferably, first of all, a portion of the structural part having the inertia belt reel, in particular a fastening bracket of the structural part having the inertia belt reel, is attached to a further component of the vehicle seat structure or inserted into a further component of the vehicle seat structure, as a result of which the pivot axis is formed. In a subsequent method step, the structural part having the inertia belt reel can be pivoted about said pivot axis into an end position and, in said end position, can be connected to a further component of the vehicle seat structure.

During the method, the structural component having the inertia belt reel can be pushed through an opening in a further component of the vehicle seat structure. During the method, the structural component having the inertia belt reel can be pushed through an opening in a side strut of a backrest structure of the vehicle seat structure.

During the method, an end region of the structural component having the inertia belt reel can be arranged in a box corner of a further component of the vehicle seat structure. During the method, an end region of the structural component having the inertia belt reel can be arranged in a box corner of a side strut of a backrest structure of the vehicle seat structure.

The vehicle seat structure can have a stop means, in particular a stop surface. During the assembly method, a structural part having the inertia belt reel can run up against the stop means on reaching the end position.

The invention creates a possibility of supplying a structural component, having an inertia belt reel, in a translational and/or rotational manner either from above and/or from the front and/or from the rear and/or in the direction of an upper region of the vehicle seat and/or in the direction of a lower region of the vehicle seat, to a substructure assembly of the vehicle seat structure and of connecting said structural component thereto. The securing is preferably formed in such a manner that tolerances can be eliminated and play and also rattling noises avoided. The assembly method preferably comprises connecting the structural component with the inertia belt reel arranged therein to at least one further component of the vehicle seat structure by means of at least one screw and/or at least one rivet and/or at least one tox connection and/or at least one clip connection and/or by means of pressing on and/or adhesively bonding and/or welding, A form-fitting connection can also be part of the assembly.

One or more headrests can be fastened to the structural component with the inertia belt reel arranged therein, in particular during the formation of the structural component as an upper crossmember of a backrest structure. A headrest can be fastened to the structural component by screwing and/or riveting and/or welding. In particular, tubes for a standard headrest can be connected to the structural component. However, a headrest having height adjustment within the headrest or an integrated headrest can also be fastened in such a way. Spring mats, speakers, rear entertainment or other complete seat parts can also be mounted on the structural component having the inertia belt reel. Additional functions, for example an airbag inflator for a side airbag, in particular positioned remotely, can be mounted within the structural component.

BRIEF DESCRIPTION OF THE FIGURES

The invention is explained in more detail below with reference to advantageous exemplary embodiments which are illustrated in the figures. However, the invention is not restricted to these exemplary embodiments. In the figures.

DETAILED DESCRIPTION

Figure 1:
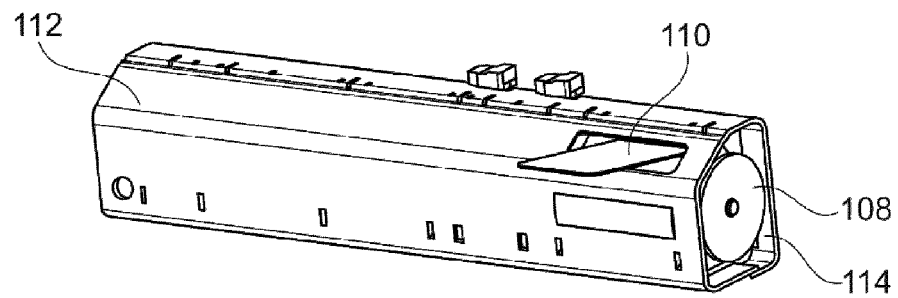
FIG. 1 shows a structural component with an inertia belt reel arranged therein.

A vehicle seat structure 100 of a vehicle seat for a motor vehicle has a seat substructure 102 and a backrest structure 104 which is adjustable in its inclination relative to the seat substructure 102 and is fastened in an inclination-adjustable manner to the seat substructure 102 by means of a fitting 106, preferably by means of two fittings 106. The vehicle seat comprises the vehicle seat structure 100, a plurality of cushion parts and cover parts covering the vehicle seat structure 100, and also further add-on parts, such as, for example, a headrest. The vehicle seat also comprises a seatbelt system, in particular a 3 point belt system, having at least one inertia belt reel 108. The inertia belt reel 108 has in particular the function of a belt retractor which retracts and unwinds a belt strap 110 of the seatbelt system. In the event of a crash, unwinding of the belt strap 110 is automatically blocked by a mechanism of the inertia belt reel 108.

The vehicle seat structure 100 will be described below using three directions in space running perpendicularly to one another. When the vehicle seat is installed in the motor vehicle, a longitudinal direction x runs substantially horizontally and preferably parallel to a vehicle longitudinal direction, which corresponds to the customary direction of travel of the vehicle. A transverse direction y running perpendicularly to the longitudinal direction x is likewise oriented horizontally in the vehicle and runs parallel to a vehicle transverse direction. A vertical direction z runs perpendicularly to the longitudinal direction x and perpendicularly to the transverse direction y. When the vehicle seat is installed in the vehicle, the vertical direction z runs parallel to the vehicle vertical axis.

The position and direction details used, such as, for example, front, rear, top and bottom, relate to a viewing direction of an occupant sitting in a normal sitting position on the vehicle seat, wherein the vehicle seat is installed in the vehicle, in a use position suitable for conveying an individual and where a backrest is upright, and is oriented as customary in the direction of travel. However, the vehicle seat can also be installed in a different orientation, for example transversely with respect to the direction of travel.

FIG. 1 shows a structural component 112 of a vehicle seat structure 100 according to a first exemplary embodiment. The inertia belt reel 108 is integrated in the structural component 112. The inertia belt reel 108 is preferably arranged in a cavity 114 of the structural component 112. The structural component 112, with the inertia belt reel 108 arranged therein, forms a testable unit which can be tested with regard to functioning in particular prior to mounting the structural component 112 on further components of the vehicle seat structure 100. The inertia belt reel 108 is preferably fixedly connected, preferably screwed, to the structural component 112. The structural component 112 can be an essential component of the inertia belt reel 108, for example can form a housing component of the inertia belt reel 108. The structural component 112 here is a profiled tube, and is preferably composed of at least two in particular profiled metal sheets.

Figure 2:
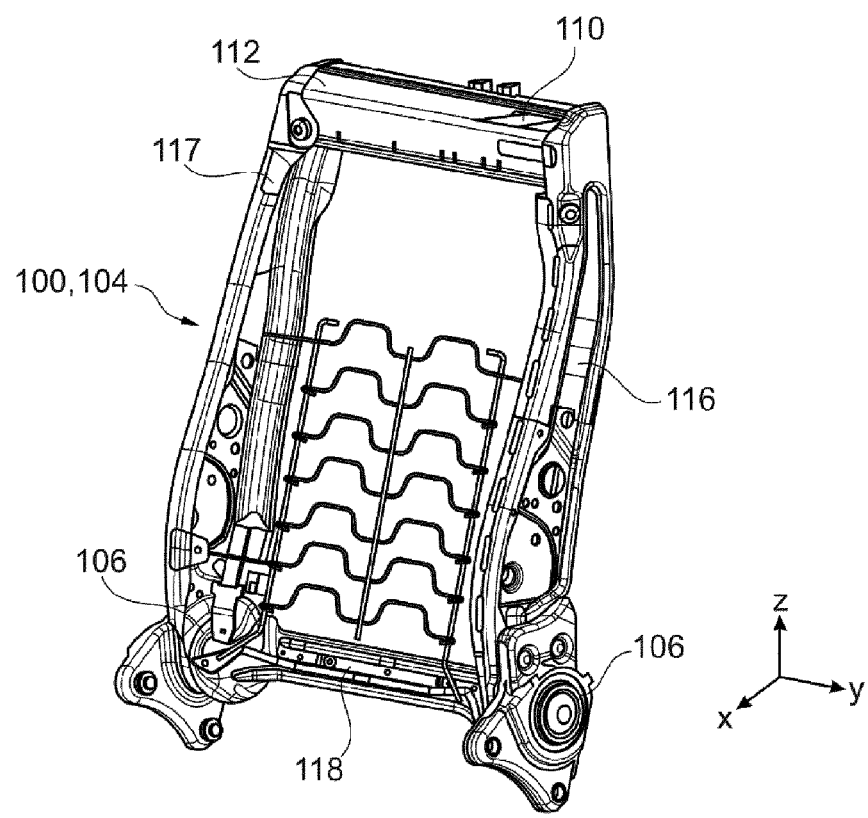
FIG. 2 shows a perspective view of a backrest structure of a vehicle seat structure obliquely from the front according to a first exemplary embodiment, in which a structural component with an inertia belt reel arranged therein forms an upper crossmember of the backrest structure.

FIG. 2 shows a backrest structure 104 of the vehicle seat structure 100 of the first exemplary embodiment, in which a structural component 112 with an inertia belt reel 108 arranged therein forms an upper crossmember of the backrest structure 104. The backrest structure 104 has two side struts 116, 117 arranged offset with respect to each other in the transverse direction y. The first side strut 116 and the second side strut 117 run preferably substantially parallel to the vertical direction z. A distance between the two side struts 116, 117 in the transverse direction y approximately corresponds to the width of the backrest structure 104, wherein the fittings 106 remain at the front on the outside in this view. The two side struts 116, 117 are connected in a lower region of the backrest structure 104 by means of a lower crossmember 118 running parallel to the transverse direction y. In addition, the two side struts 116, 117 are connected in an upper region of the backrest structure 104 by means of the structural component 112.

Figure 3:
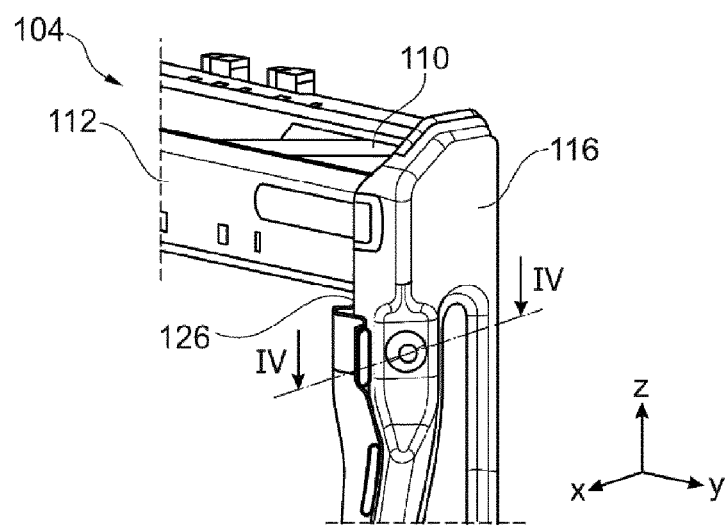
FIG. 3 shows a partial perspective view of a backrest structure of a vehicle seat obliquely from the front according to a second exemplary embodiment, in which a structural component with an inertia belt reel arranged therein forms an upper crossmember of the backrest structure.
Figure 4:
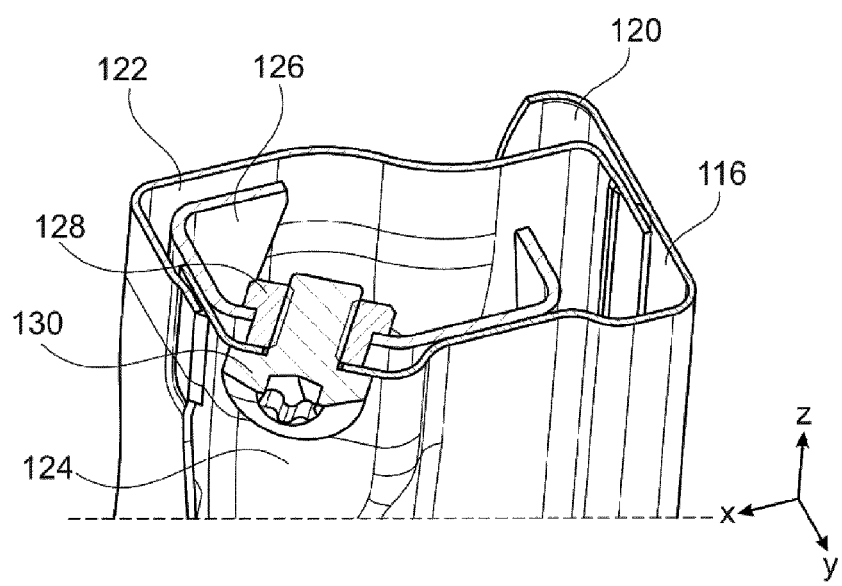
FIG. 4 shows a section along the line IV-IV in FIG. 3.

FIGS. 3 and 4 show part of a backrest structure 104 of a vehicle seat structure 100 of a second exemplary embodiment, in which a structural component 112 with an inertia belt reel 108 arranged therein forms an upper crossmember of the backrest structure 104. A first side strut 116 of the two side struts 116, 117 is composed of a first side strut profile 120 and a second side strut profile 122. The first side strut 116 is thereby a substantially closed profile with high flexural rigidity and can thus transmit high forces acting on the belt strap 110 in the event of a crash in the direction of the fittings 106. The first side strut 116, as viewed in the transverse direction y, is arranged on that side of the structural component 112 from which the belt strap 110 emerges.

The first side strut profile 120 and the second side strut profile 122 are connected to each other, preferably welded to each other. The first side strut 116 has a cavity with an approximately rectangular cross section. Below the structural component 112, the first side strut 116 has a fastening surface 124 which runs obliquely with respect to the longitudinal direction x and obliquely with respect to the transverse direction y and has a screw through hole.

A fastening bracket 126 of the structural component 112 is pushed from above into the cavity of the first side strut 116. The fastening bracket 126 protrudes downward from the structural component 112. The fastening bracket 126 is fixedly connected to the structural component 112. The fastening bracket 126 lies in each case in the longitudinal direction x and in the transverse direction y on an inner surface of the first side strut 116. The fastening bracket 126 has a thread, in particular a threaded nut 128, which is aligned with the screw through hole of the fastening surface 124. A screw 130, preferably with a thread M10 or 7/16 inches, protrudes through the screw through hole and is screwed into the threaded nut 128. The fastening bracket 126 and consequently the structural component 112 are thereby screwed to the first side strut 116. The screw 130 here draws the fastening bracket 126 in the longitudinal direction x and in the transverse direction y against in each case a corresponding inner surface of the first side strut 116 in such a manner that the fastening bracket 126 lies against the first side strut 116 in two directions in space.

The structural component 112 can be fastened to the second side strut 117 in an analogous manner. Alternatively or additionally, the structural component 112 can be connected to the second side strut 117 in a form-fitting manner.

Figure 5:
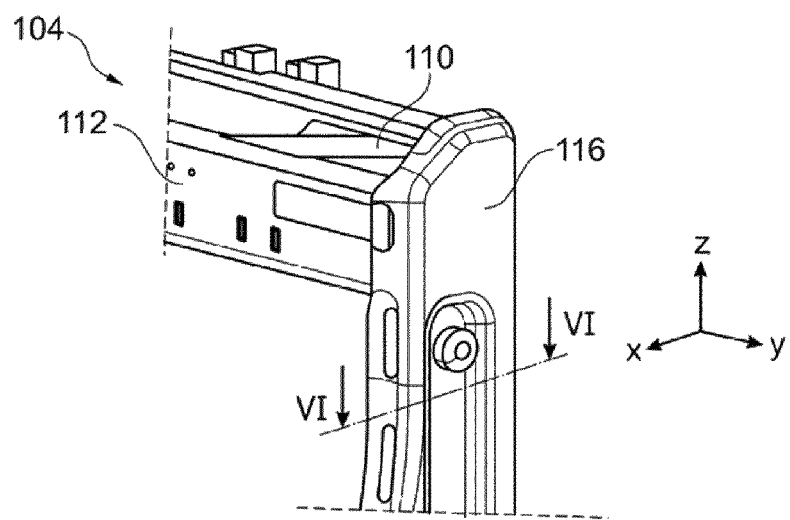
FIG. 5 shows a partial perspective view of a backrest structure of a vehicle seat structure obliquely from the front according to a third exemplary embodiment, in which a structural component with an inertia belt reel arranged therein forms an upper crossmember of the backrest structure.
Figure 6:
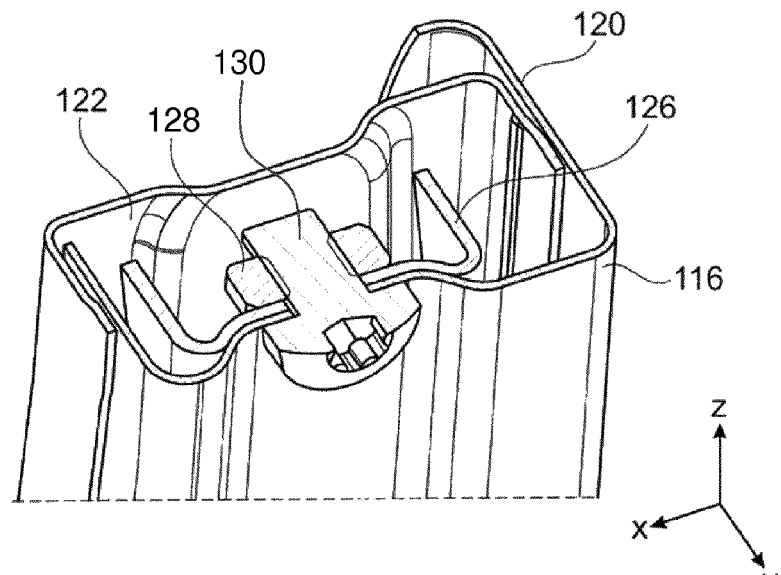
FIG. 6 shows a section along the line VI-VI in FIG. 5.

FIGS. 5 and 6 show part of a backrest structure 104 of a vehicle seat structure 100 of a third exemplary embodiment that corresponds to the second exemplary embodiment apart from the differences which are illustrated in the figures and are described below. Comparable components of the various exemplary embodiments therefore bear the same reference signs. This also applies to the other exemplary embodiments described previously and below.

In contrast to the second exemplary embodiment, in the third exemplary embodiment, a fastening bracket 126 is screwed to a screw 130 which runs parallel to the transverse direction y. The fastening bracket 126 is thereby drawn against precisely one inner surface of the first side strut 116. As a result, the fastening bracket 126 lies against the first side strut 116 in only precisely one direction in space. During the assembly, the fastening bracket 126 can be displaced to a limited extent in the longitudinal direction x relative to the first side strut 116 before the screw 130 is tightened.

Figure 7:
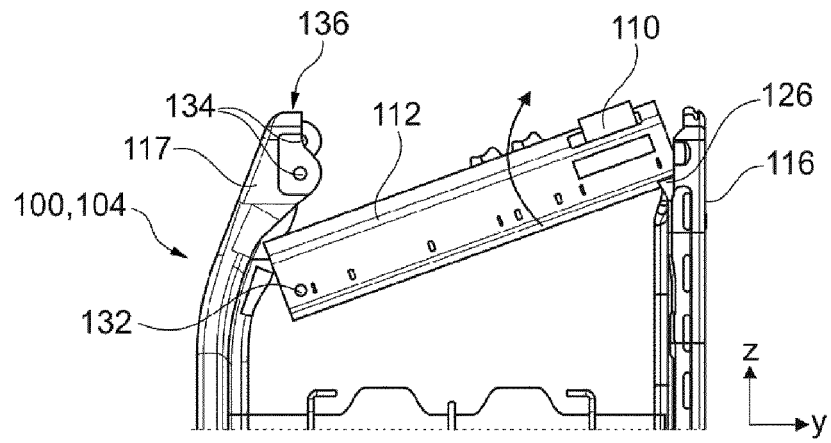
FIG. 7 shows a partial front view of a vehicle structure according to a fourth exemplary embodiment during the assembly of a backrest structure, wherein a structural component with an inertia belt reel arranged therein is pivoted about a longitudinal direction relative to two side struts of the backrest structure in the direction of an end position.
Figure 8:
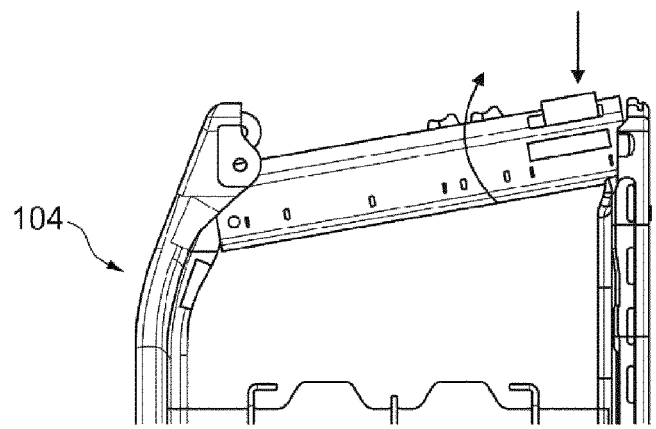
FIG. 8 shows a partial front view of the backrest structure from FIG. 7, wherein the structural component with the inertia belt reel arranged therein is pivoted further in the direction of an end position.
Figure 9:
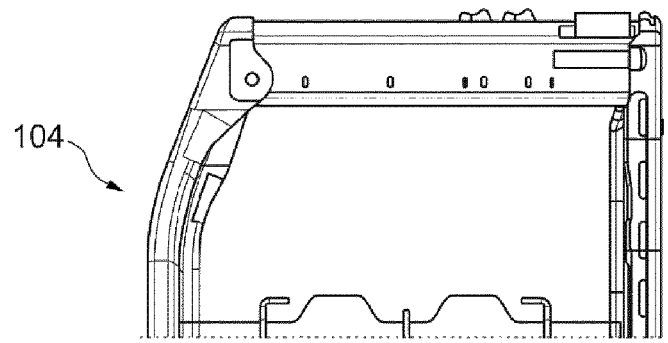
FIG. 9 shows a partial front view of the backrest structure from FIG. 7 in a mounted state.

FIGS. 7 to 9 show a partial front view of a vehicle seat structure 100 according to a fourth exemplary embodiment during the assembly of a backrest structure 104, wherein a structural component 112 with an inertia belt reel arranged therein is pivoted approximately about a pivot axis running approximately parallel to the longitudinal direction x relative to two side struts 116, 117 of the backrest structure 104 in the direction of an end position. In this case, first of all a fastening bracket 126 of the structural part 112 is inserted into a cavity of one of the two side struts 116 and then pivoted in the direction of the end position of the structural part 112. After the end position of the structural part 112 relative to the side struts 116, 117 is reached, the structural part 112 is screwed to an end of the structural part 112 opposite the fastening bracket 126 by means of at least one screw. For this purpose, the second side strut 117 has two through holes 134 which, in the end position of the structural part 112, are aligned with corresponding threads 132 of the structural part 112.

In order to enable the method, described previously and illustrated in FIGS. 7 to 9, for assembling the backrest structure 104 of a vehicle seat structure 100, the fastening bracket 126 can be inserted into the upper end of the first side strut 116 in such a manner that the structural part 112 can be pivoted to a limited extent about a pivot axis running approximately parallel to the longitudinal direction x.

The upper regions of the side struts 116, 117 are preferably in each case designed as a U profile, with the open sides of the two side struts 116, 117 facing each other. The structural part 112 can thereby be pivoted into the side struts 116, 117 in the previously described manner. At least one upper end region of the side struts 116, 117 can have a stop surface 136 which is designed in such a manner that the structural part 112 runs up against said stop surface 136 on reaching the end position of the structural part 112.

Figure 10:
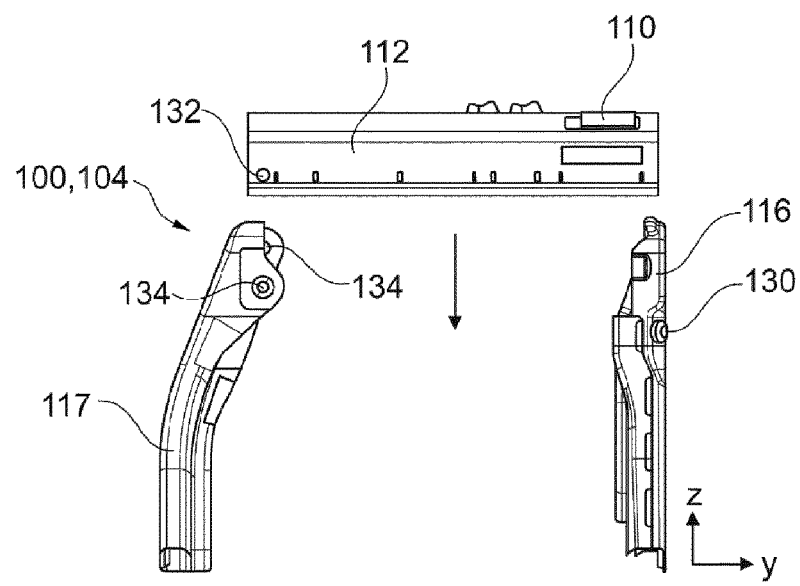
FIG. 10 shows a partial front view of the vehicle seat structure according to a fifth exemplary embodiment during the assembly of a backrest structure, wherein a structural component with an inertia belt reel arranged therein is moved counter to a vertical direction in the direction of an end position.

FIG. 10 shows a partial front view of a vehicle seat structure 100 according to a fifth exemplary embodiment during the assembly of a backrest structure 104, wherein a structural component 112 with an inertia belt reel arranged therein is pushed approximately counter to the vertical direction from above into the side struts 116, 117 of the backrest structure 104 in the direction of an end position. After the end position of the structural part 112 relative to the side struts 116, 117 is reached, the structural part 112 is screwed down on both sides by means of at least one screw in each case. For this purpose, that end of the structural part 112 which is assigned to the first side strut 116 can have a fastening bracket, not illustrated in FIG. 10. The second side strut 117 can have two through holes 134 which, in the end position of the structural part 112, are aligned with corresponding threads 132 of the structural part 112.

The upper regions of the side struts 116, 117 are preferably designed in each case as a U profile, with the open sides of the two side struts 116, 117 facing each other. The structural part 112 can thereby be inserted into the side struts 116, 117 in the previously described manner. At least one of the side struts 116, 117 can have a stop means, not illustrated in the figures, which is designed in such a manner that the structural part 112 runs up against said stop means on reaching the end position of the structural part 112.

Figure 11:
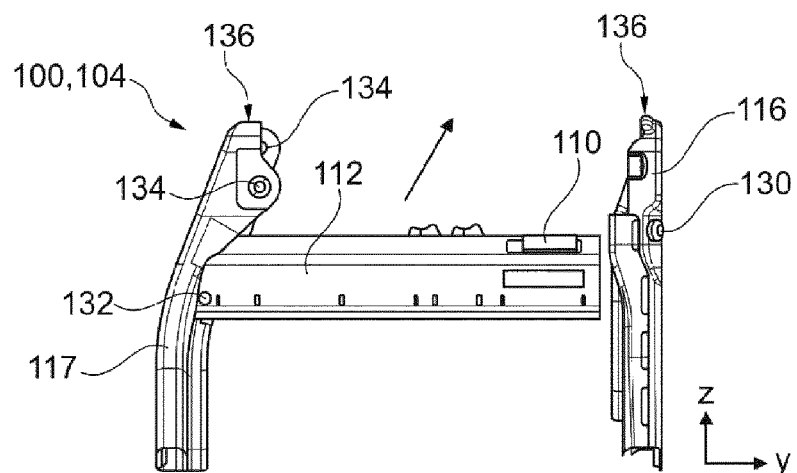
FIG. 11 shows a partial front view of the vehicle seat structure according to a sixth exemplary embodiment during the assembly of a backrest structure, wherein a structural component with an inertia belt reel arranged therein is moved obliquely with respect to a vertical direction in the direction of an end position.

FIG. 11 shows a partial front view of a vehicle seat structure 100 according to a sixth exemplary embodiment during the assembly of a backrest structure 104, wherein a structural component 112 with an inertia belt reel arranged therein is pushed approximately counter to the vertical direction from above into two side struts 116, 117 of the backrest structure 104 in the direction of an end position. After the end position of the structural part 112 relative to the side struts 116, 117 is reached, the structural part 112 is screwed down on both sides by means of at least one screw in each case. For this purpose, that end of the structural part 112 which is assigned to the first side strut 116 can have a fastening bracket, not illustrated in FIG. 10. The second side strut 117 can have two through holes 134 which, in the end position of the structural part 112, are aligned with corresponding threads 132 of the structural part 112.

The upper regions of the side struts 116, 117 are preferably designed in each case as a U profile, with the open sides of the two side struts 116, 117 facing each other. The structural part 112 can thereby be inserted into the side struts 116, 117 in the previously described manner. At least one upper end region of the side struts 116, 117 can have a stop surface 136 which is designed in such a manner that the structural part 112 runs up against said stop surface 136 on reaching the end position of the structural part 112.

Figure 12:
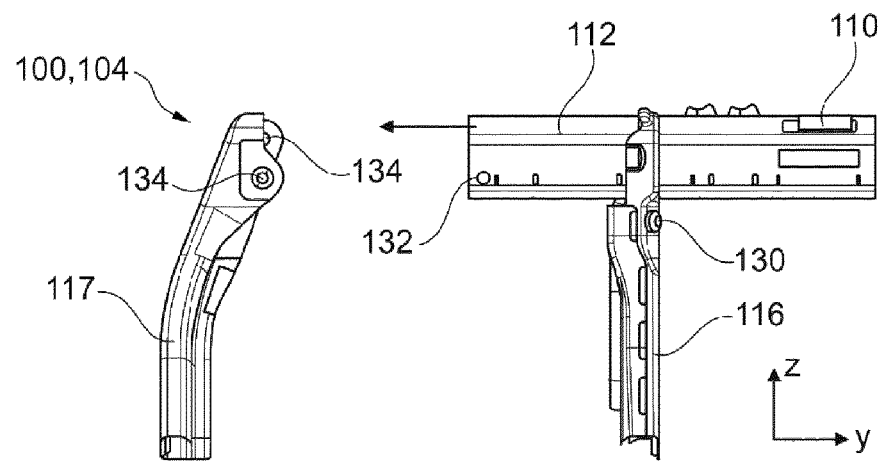
FIG. 12 shows a partial front view of the vehicle seat structure according to a seventh exemplary embodiment during the assembly of a backrest structure, wherein a structural component with an inertia belt reel arranged therein is moved counter to a transverse direction in the direction of an end position.

FIG. 12 shows a partial front view of a vehicle seat structure 100 according to a seventh exemplary embodiment during the assembly of a backrest structure 104, wherein a structural component 112 with an inertia belt reel arranged therein is pushed parallel to the transverse direction y through an opening in the first side strut 116 in the direction of the second side strut 117. In an end position of the structural component 112, the latter lies against the second side strut 117 counter to the transverse direction y. After the end position of the structural part 112 relative to the side struts 116, 117 is reached, the structural part 112 is screwed down to the second side strut 117, preferably also to the first side strut 116, by means of at least one screw. The second side strut 117 can have two through holes 134 which, in the end position of the structural part 112, are aligned with corresponding threads 132 of the structural part 112.

The upper regions of the side struts 116, 117 are preferably designed in each case as a U profile, with the open sides of the two side struts 116, 117 facing each other.

In addition, the profile of the first side strut 116 has the opening through which the structural part 112 is pushed. The structural part 112 can thereby be inserted into the side struts 116, 117 in the previously described manner.

Figure 13:
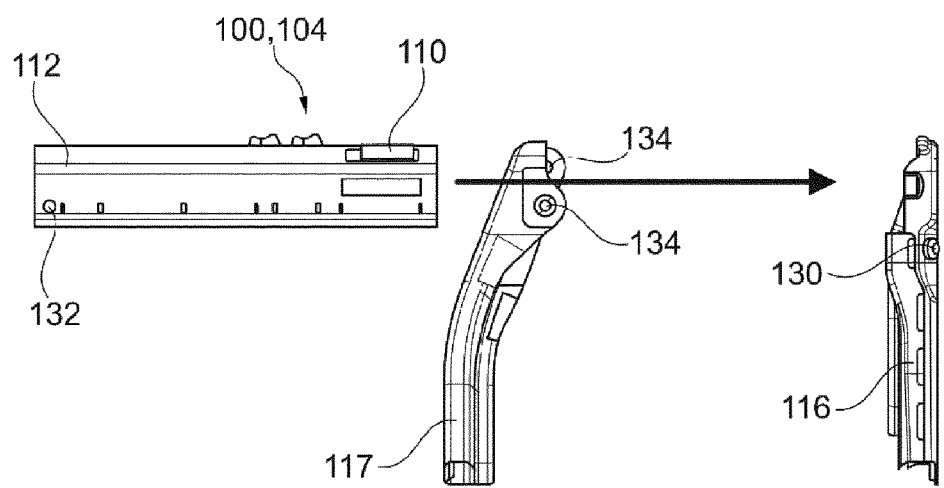
FIG. 13 shows a partial front view of the vehicle seat structure according to an eighth exemplary embodiment during the assembly of a backrest structure, wherein a structural component with an inertia belt reel arranged therein is moved in the transverse direction in the direction of an end position.

FIG. 13 shows a partial front view of a vehicle seat structure 100 according to an eighth exemplary embodiment during the assembly of a backrest structure 104, wherein a structural component 112 with an inertia belt reel arranged therein is pushed parallel to the transverse direction y through an opening in the second side strut 117 in the direction of the first side strut 116. In an end position of the structural component 112, the latter lies against the first side strut 117 counter to the transverse direction y. After the end position of the structural part 112 relative to the side struts 116, 117 is reached, the structural part 112 is screwed down to the second side strut 117, preferably also to the first side strut 116, by means of at least one screw. The second side strut 117 can have two through holes 134 which, in the end position of the structural part 112, are aligned with corresponding threads 132 of the structural part 112.

The upper regions of the side struts 116, 117 are preferably designed in each case as a U profile, with the open sides of the two side struts 116, 117 facing each other. In addition, the profile of the second side strut 117 has the opening through which the structural part 112 is pushed. The structural part 112 can thereby be inserted into the side struts 116, 117 in the previously described manner.

Figure 14:
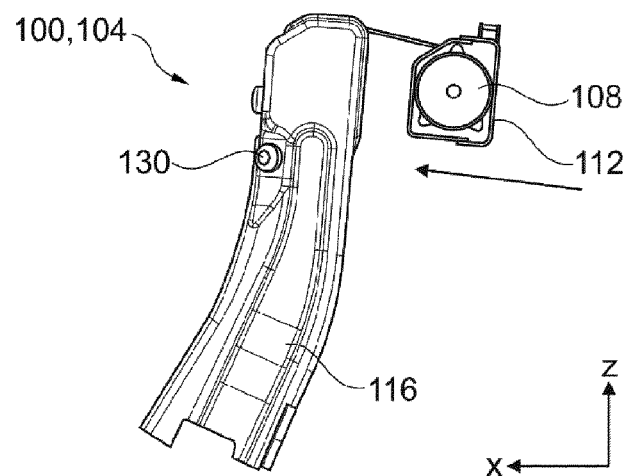
FIG. 14 shows a partial side view of the vehicle seat structure according to a ninth exemplary embodiment during the assembly of a backrest structure, wherein a structural component with an inertia belt reel arranged therein is moved in the longitudinal direction x in the direction of an end position.

FIG. 14 shows a partial side view of a vehicle seat structure 100 according to a ninth exemplary embodiment during the assembly of a backrest structure 104, wherein a structural component 112 with an inertia belt reel 108 arranged therein is pushed approximately in the longitudinal direction x into the side struts 116, 117. In an end position of the structural component 112, the latter lies against the side struts 116, 117 in the longitudinal direction x. After the end position of the structural part 112 relative to the side struts 116, 117 is reached, the structural part 112 is screwed down to the first side strut 116, preferably also to the second side strut 117, by means of at least one screw 130.

The upper regions of the side struts 116, 117 are preferably designed in each case as an L profile. The upper end regions of the side struts 116, 117 are preferably designed as box corners. The structural part 112 can thereby be inserted into the side struts 116, 117 in the previously described manner.

Figure 15:
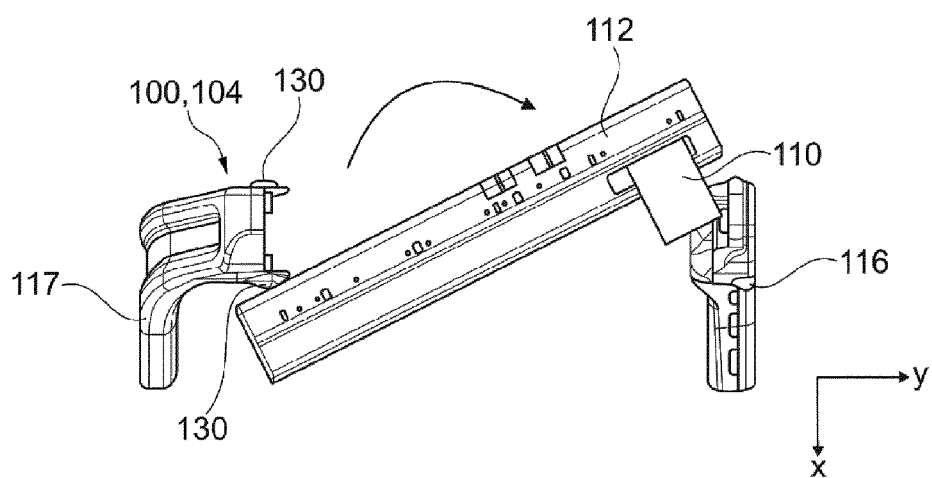
FIG. 15 shows a partial view from above of the vehicle seat structure according to a tenth exemplary embodiment during the assembly of a backrest structure, wherein a structural component with an inertia belt reel arranged therein is pivoted about the vertical direction in the direction of an end position.

FIG. 15 shows a partial view from above of a vehicle seat structure 100 according to a tenth exemplary embodiment during the assembly of a backrest structure 104, wherein a structural component 112 with an inertia belt reel arranged therein is pivoted approximately about a pivot axis running approximately parallel to the vertical direction z relative to two side struts 116, 117 of the backrest structure 104 in the direction of an end position. After the end position of the structural part 112 relative to the side struts 116, 117 is reached, the structural part 112 is screwed down to the side struts 116, 117 in each case by means of at least one screw 130.

The upper regions of the side struts 116, 117 are preferably designed in each case as an L profile, wherein the first side strut 116 is open to the rear and the second side strut 117 is open to the front.

Figure 16:
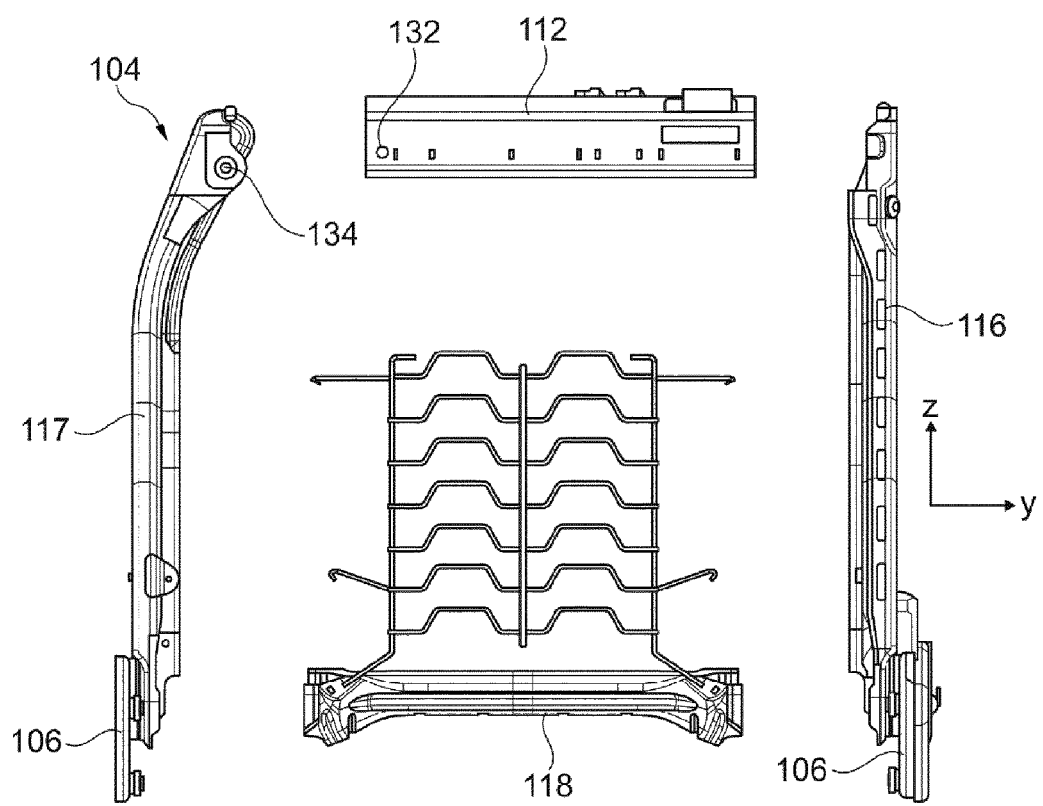
FIG. 16 shows a view from the front in an exploded illustration of a backrest structure of a vehicle seat structure according to an eleventh exemplary embodiment.

FIG. 16 shows a view from the front in an exploded illustration of a backrest structure 104 of a vehicle seat structure according to an eleventh exemplary embodiment during the assembly of the backrest structure 104. A first side strut 116 and a second side strut 117 are moved toward each other in or counter to the transverse direction y and in the process receive a structural component 112 with an inertia belt reel arranged therein, and receive a lower crossmember 118.

After the end position of the side struts 116, 117 relative to the structural part 112 is reached, the structural part 112 is screwed down to the side struts 116, 117 by means of at least one screw in each case. The second side strut 117 and preferably also the first side strut 116 can each have at least one through hole 134 which, in the end position of the structural part 112, is aligned with corresponding threads 132 of the structural part 112.

The upper regions of the side struts 116, 117 are preferably in each case designed as a U profile, with the open sides of the two side struts 116, 117 facing each other.

Figure 17:
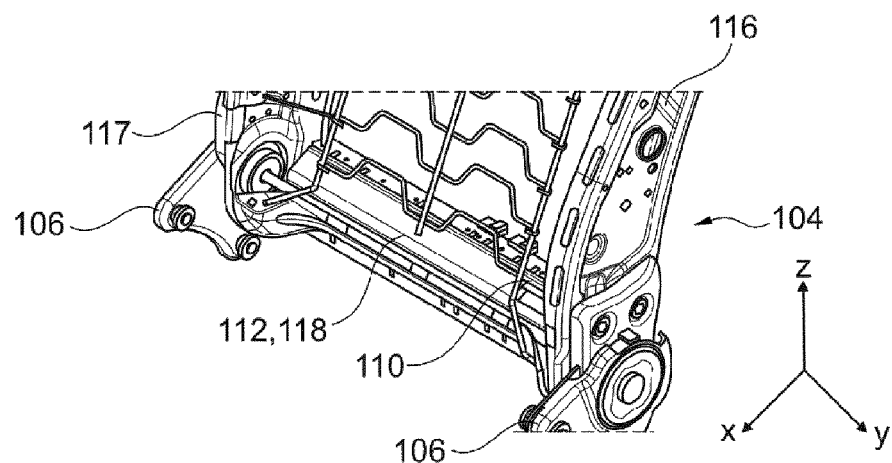
FIG. 17 shows a partial perspective view obliquely from the front of the backrest structure of a vehicle seat structure according to a twelfth exemplary embodiment, in which a structural component with an inertia belt reel arranged therein forms a lower crossmember of the backrest structure.
Figure 18:
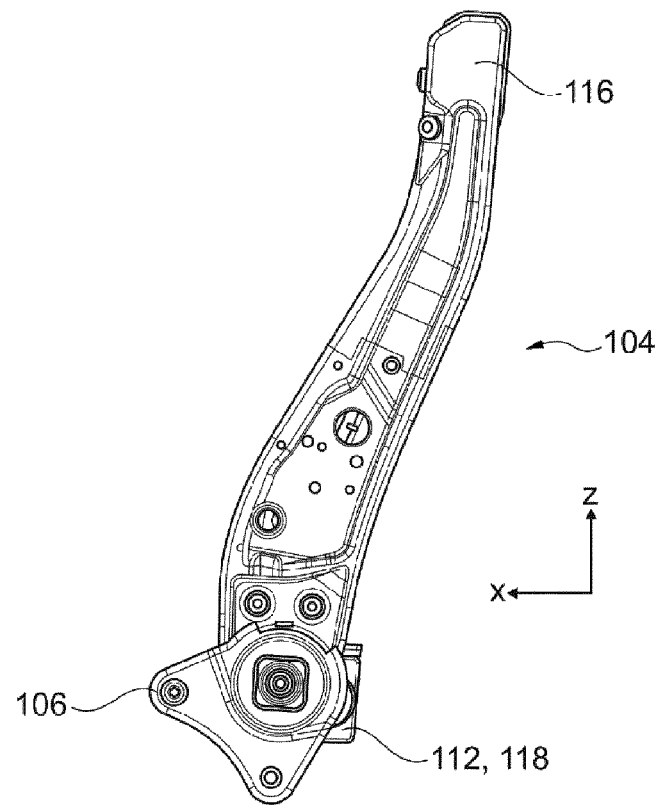
FIG. 18 shows a side view of the backrest structure from FIG. 17.

FIGS. 17 and 18 show a backrest structure 104 of a vehicle seat structure according to a twelfth exemplary embodiment, in which a structural component 112 with an inertia belt reel arranged therein forms a lower crossmember 118 of the backrest structure 104.

Figure 19:
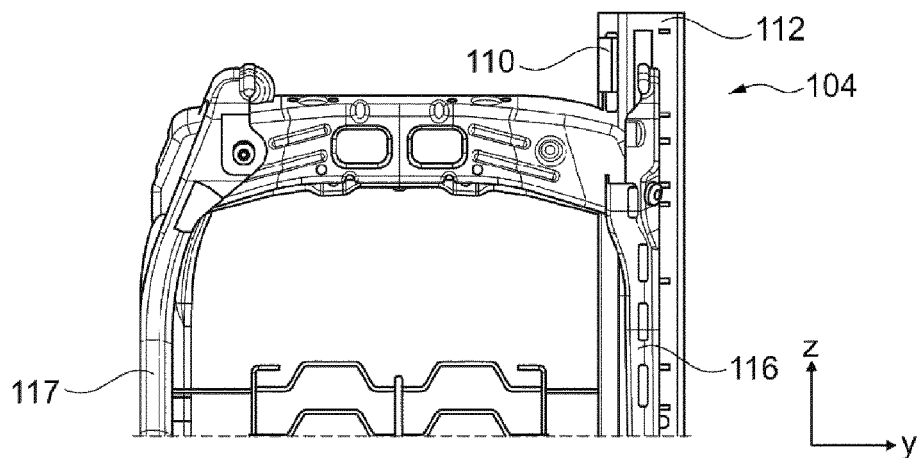
FIG. 19 shows a partial front view of the backrest structure of a vehicle seat structure according to a thirteenth exemplary embodiment, in which a structural component with an inertia belt reel arranged therein forms part of a side strut of the backrest structure.
Figure 20:
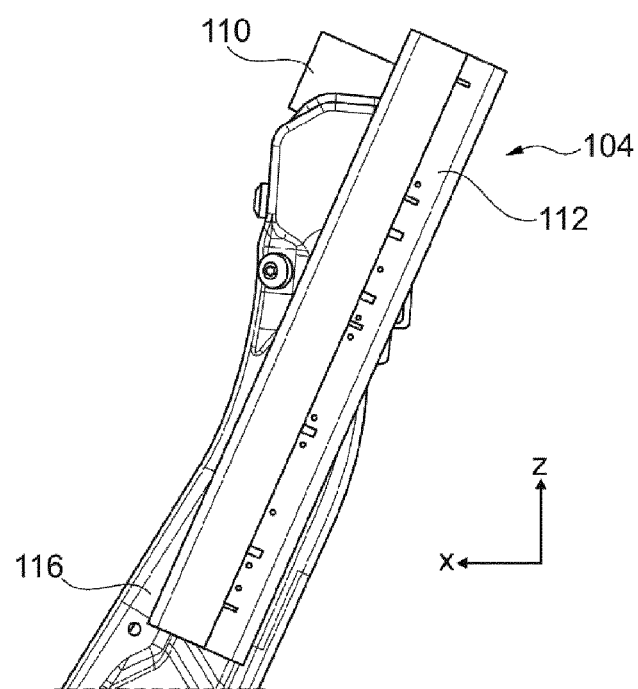
FIG. 20 shows a partial side view of the backrest structure from FIG. 19.

FIGS. 19 and 20 show a backrest structure 104 of a vehicle seat structure according to a thirteenth exemplary embodiment, in which a structural component 112 with an inertia belt reel arranged therein forms part of a first side strut 116 of the backrest structure 104. A belt strap 110 is correspondingly deflected.

Figure 21:
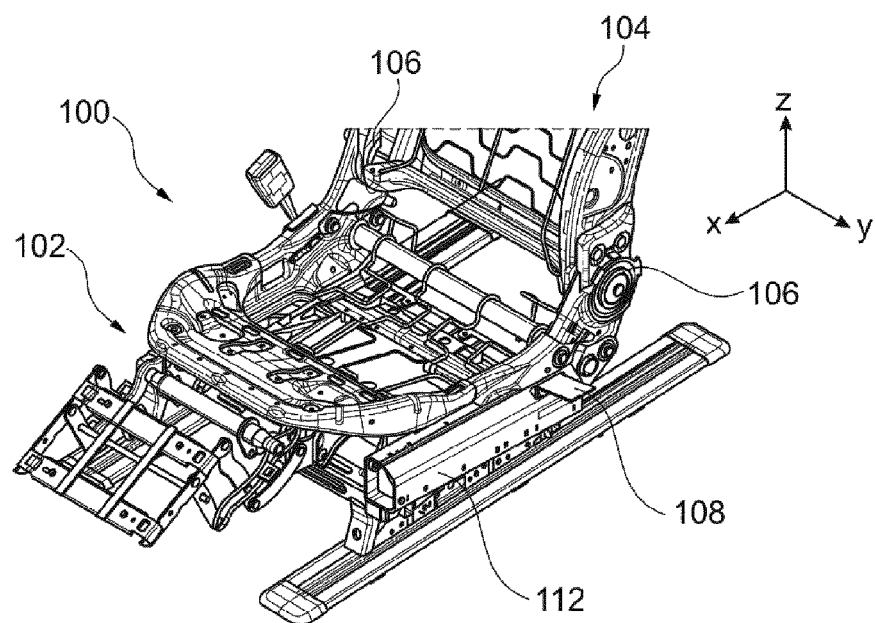
FIG. 21 shows a partial perspective view obliquely from the front of a vehicle seat structure according to a fourteenth exemplary embodiment, in which a structural component with an inertia belt reel arranged therein reinforces a side part of a seat substructure.
Figure 22:
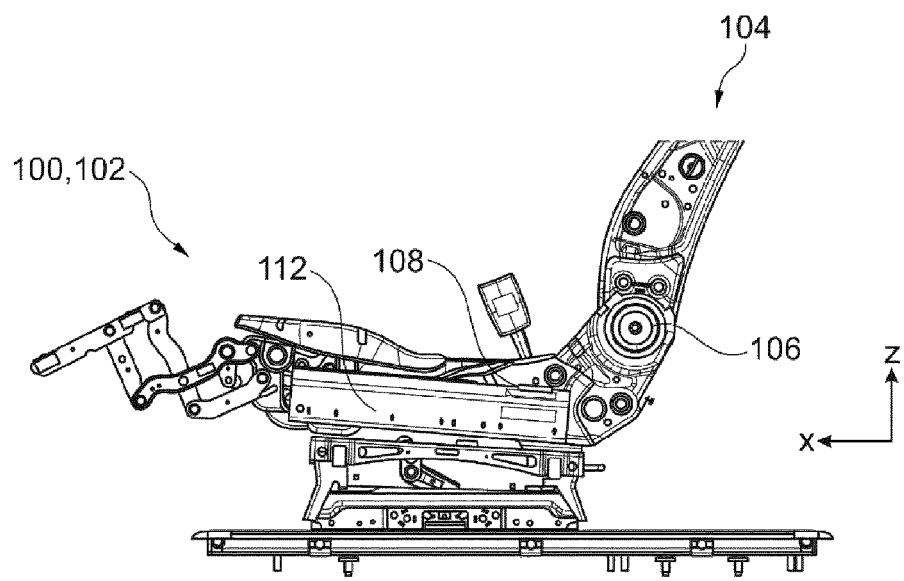
FIG. 22 shows a side view of the vehicle seat structure from FIG. 21.

FIGS. 21 and 22 show a seat substructure 102 of a vehicle seat structure 100 according to a fourteenth exemplary embodiment, in which a structural component 112 with an inertia belt reel arranged therein forms part of the seat substructure 102, in particular a seat frame side part. The inertia belt reel can in particular retract a lap belt of a seatbelt system, in particular of a 3 point belt system. In addition, the seatbelt system can additionally have a second inertia belt reel in the region of the backrest 104.

Figure 23:
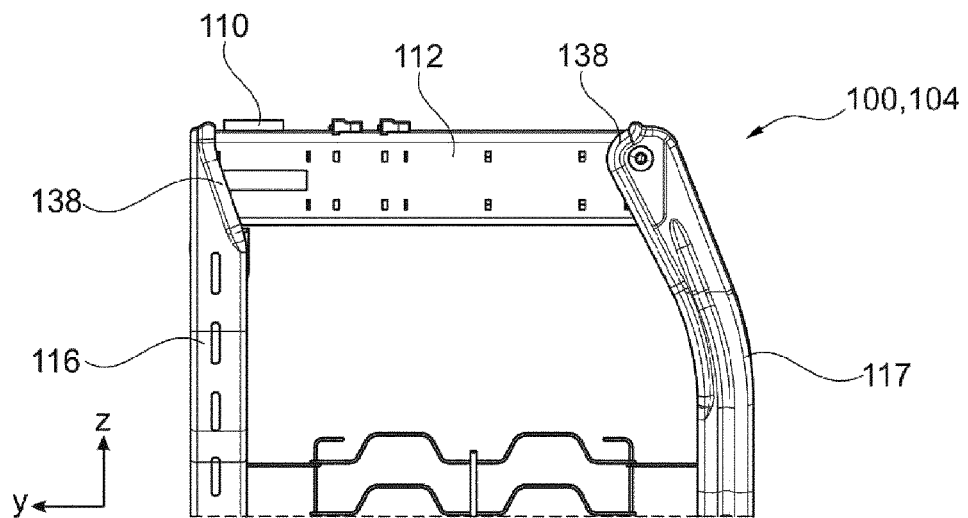
FIG. 23 shows a partial rear view of a backrest structure of a vehicle seat structure according to a fifteenth exemplary embodiment, in which a structural component with an inertia belt reel arranged therein forms an upper crossmember of the backrest structure.
Figure 24:
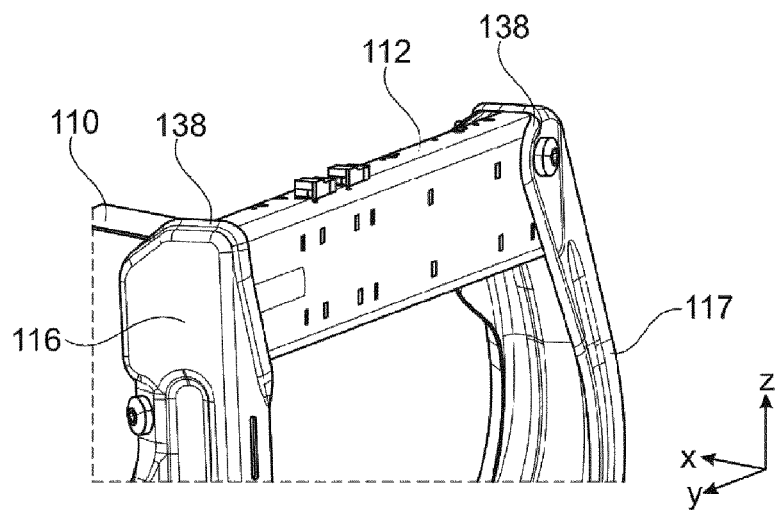
FIG. 24 shows a partial perspective view of the backrest structure from FIG. 23 obliquely from the front.

FIGS. 23 and 24 show a rear view of a backrest structure 104 of a vehicle seat structure 100 according to a fifteenth exemplary embodiment, in which a structural component 112 with an inertia belt reel arranged therein forms an upper crossmember of the backrest structure 104. The backrest structure 104 has a first side strut 116 and a second side strut 117. The edges of the side struts 116, 117 are rounded at least partially and in sections in order to be able to meet the legal head impact tests. In particular, rearwardly facing edges of the side struts 116, 117 have rounded portions 138. The rounded portions can have a semicircular cross section. The rounded portions can have a polygonal cross section. The rounded portions can have a cross section which can be approximated by a polynomial.

Figure 25:
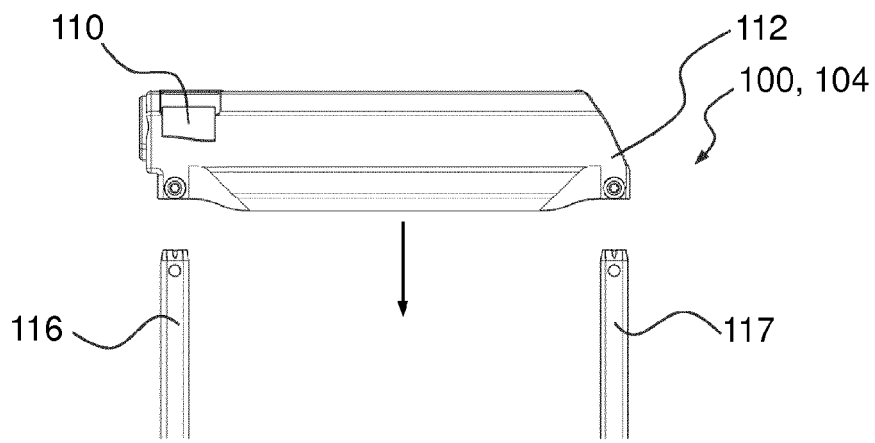
FIG. 25 shows a partial front view of a vehicle seat structure according to a sixteenth exemplary embodiment during the assembly of a backrest structure, wherein a structural component with an inertia belt reel arranged therein is moved counter to a vertical direction in the direction of an end position.
Figure 26:
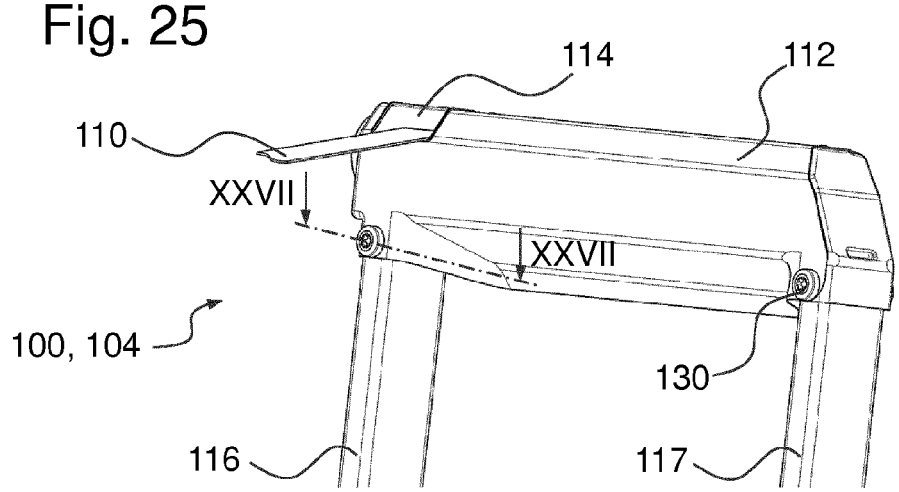
FIG. 26 shows a partial perspective view of the backrest structure from FIG. 25 obliquely from the front.
Figure 27:
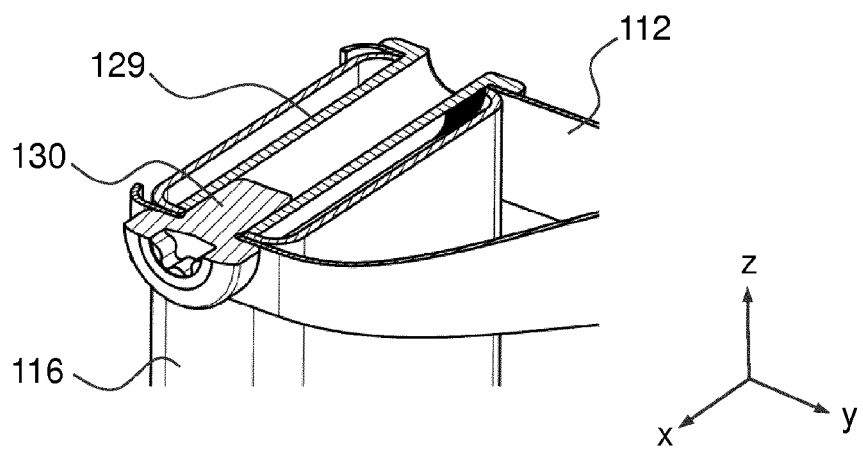
FIG. 27 shows a section along the line XXVII-XXVII in FIG. 26.

FIGS. 25 to 27 show a vehicle seat structure 100 according to a sixteenth exemplary embodiment. FIG. 25 shows the vehicle seat structure 100 during the assembly of a backrest structure 104, wherein a structural component 112 with an inertia belt reel arranged therein is pushed approximately counter to the vertical direction z from above onto two side struts 116, 117 of the backrest structure 104 in the direction of an end position. For this purpose, the upper end regions of the side struts 116, 117 preferably in each case have a rectangular cross section. The structural component 112 in each case has, on both sides, as viewed in the transverse direction y, an opening into which the end regions of the side struts 116, 117 are received and have been received in the mounted state of the vehicle seat structure 100.

The end regions of the side struts 116, 117 can thereby be inserted into the structural part 112. At least one of the side struts 116, 117 can have a stop means, not illustrated in the figures, which is designed in such a manner that the structural part 112 runs up against said stop means on reaching the end position of the structural part 112.

After the end position, illustrated in FIG. 26, of the structural part 112 relative to the side struts 116, 117 is reached, the structural part 112 is screwed down on both sides by means of at least one screw 130 in each case. FIG. 27 shows a section through one of the two screw connections, specifically through that between the first side strut 116 and the structural part 112. An opposite screw connection between the second side strut 117 and the structural part 112 is analogous, preferably mirror-symmetrical with respect to the screw connection illustrated in FIG. 27.

The side strut 116 and the structural part 112 each have two through holes which are aligned with each other. In the end position of the structural part 112, the through holes of the side strut 116 are aligned with the associated through holes of the structural part 112. A threaded sleeve 129 with a collar and an internal thread is pushed through the aligned through holes into the structural part 112 and the side strut 116 to an extent such that the collar of the threaded sleeve 129 lies against the outside of the structural part 112. An end side of the threaded sleeve 129 facing away from the collar of the threaded sleeve 129 preferably lies on the inside against the side strut 116. From that side of the structural part 112 which faces away from the collar of the threaded sleeve 129, the screw 130 passes through the two other through holes in the structural part 112 and the side strut 116 and is screwed into the internal thread of the threaded sleeve 129. A screw head of the screw 130 lies against the structural part 112. The structural part 112 is thereby fixedly connected to the side strut 116.

In a modification of the sixteenth exemplary embodiment, at least one threaded sleeve 129 is replaced by a threaded nut. In a further modification of the sixteenth exemplary embodiment, at least one screw connection is replaced by a rivet connection. In a further modification of the sixteenth exemplary embodiment, at least one screw connection is replaced by a weld connection. In a further modification of the sixteenth exemplary embodiment, at least one screw connection is replaced by an adhesive connection.

The features disclosed in the above description, in the claims and in the figures may be of importance both individually and in combination for realizing the invention in its various refinements.

Although the invention has been described in detail in the drawings and the preceding description, the descriptions should be understood as illustrative and exemplary and not restrictive. In particular, the selection of the graphically illustrated proportions of the individual elements should not be interpreted as required or restrictive. Furthermore, the invention is in particular not restricted to the exemplary embodiments explained. Further variants of the invention and the implementation thereof will be apparent to a person skilled in the art from the preceding disclosure, the figures and the claims.

Terms, such as "comprise", "have", "include", "contain" and the like which are used in the claims do not rule out further elements or steps. The use of the indefinite article does not rule out a plural. A single device can carry out the functions of a plurality of units or devices mentioned in the claims.

LIST OF REFERENCE SIGNS

100 Vehicle seat structure
102 Seat substructure
104 Backrest structure
106 Fitting
108 Inertia belt reel
110 Belt strap
112 Structural component
114 Cavity
116 First side strut
117 Second side strut
118 Lower crossmember
120 First side strut profile
122 Second side strut profile
124 Fastening surface
126 Fastening bracket
128 Threaded nut
129 Threaded sleeve
130 Screw
132 Thread
134 Through hole
136 Stop surface
138 Rounded portion
x Longitudinal direction
y Transverse direction
z Vertical direction

What is claimed is:

1. A vehicle seat structure for a vehicle seat, comprising a structural component having an inertia belt reel, wherein the inertia belt reel is arranged in a cavity of the structural component, and the structural component is connected to at least one further component of the vehicle seat structure in a form-fitting and/or force-fitting manner, wherein the vehicle seat structure has a backrest structure, the backrest structure having a first side strut and a second side strut, wherein the structural component having the inertia belt reel connects the two side struts to each other, wherein the structural component in each case has, on both sides, as viewed in the transverse direction y, an opening into which the end regions of the side struts are received and the structural part is screwed down on both sides by at least one screw in each case.

2. The vehicle seat structure as claimed in claim 1, wherein at least one of the two side struts is comprised of a first side strut profile and at least one second side strut profile, wherein the first side strut profile and the at least one second side strut profile form a substantially closed profile.

3. The vehicle seat structure as claimed in claim 1, wherein the inertia belt reel for retracting a shoulder belt of a belt system, including a 3 point belt system, is arranged in the structural component.

4. A method for assembling a vehicle seat structure, comprising providing a structural component having an inertia belt reel and at least one further component of the vehicle seat structure that are displaced and/or rotated relative to one another such that the structural component and the at least one further component of the vehicle seat structure take up an end position with respect to one another, and, in a further step, are connected to one another in a form-fitting and/or force-fitting manner, wherein the vehicle seat structure has a backrest structure, the backrest structure having a first side strut and a second side strut, wherein the structural component having the inertia belt reel connects the two side struts to each other, wherein the structural component in each case has, on both sides, as viewed in the transverse direction y, an opening into which the end regions of the side struts are received and the structural part is screwed down on both sides by at least one screw in each case.

5. The method as claimed in claim 4, wherein the structural component having the inertia belt reel is a testable unit, the functioning of which is tested prior to the connection of the structural component having the inertia belt reel to the at least one further component of the vehicle seat structure, including the functioning of the inertia belt reel is tested.

* * * * *